Patented Nov. 7, 1950

2,529,389

UNITED STATES PATENT OFFICE 2,529,389

METHOD OF MAKING WOOD SEPARATORS FOR LEAD-ACID ELECTRIC ACCUMULATORS

Harold John Hampton, Clifton Junction, near Manchester, England, assignor to The Electric Storage Battery Co., a corporation of New Jersey No Drawing. Application January 25, 1947, Serial No. 724,477. In Great Britain December 10, 1945

Section 1, Public Law 690, August 8, 1946
Patent expires December 10, 1965

3 Claims. (Cl. 117—57)

It is known to use in lead acid accumulators highly porous separators made from certain natural woods such as Balsa or manufactured by compressing wood in fibrous or powder form into slabs or sheets, said wood or fabricated slabs being treated, as for example, with caustic soda in such a manner as to eliminate resins, organic acids, and other substances known to be deleterious to the electrodes. Such highly porous materials have been used because they can accommodate or absorb the main bulk of the electrolyte in a cell or accumulator and thus enable a cell to be readily produced of the non-spill type without loss of capacity.

The main disadvantage in the use of these materials, especially when they are required in thin sections, lies in their lack of mechanical strength, particularly after a short period of service under normal working conditions. This disadvantage can be avoided by the use of a satisfactory bonding agent, such as a resin of the thermo-setting type, e. g. phenolformaldehyde or of the thermoplastic type e. g. polyvinyl chloride and polymethyl-methacrylate. The use of resins for imparting strength to fibrous materials, such as paper, wood pulp, asbestos and the like, for various purposes is well known. One method of treatment is to impregnate the material with a solution of the resin, from which the solvent is removed by evaporation, the resin being finally cured. After such treatment the porosity of the material is extremely low.

In the case of material for use as accumulator separators, it is essential that a high degree of porosity be maintained and that the electrical resistance of the separator as a diphragm in sulphuric acid should be low. A considerably more dilute solution of the resin must therefore be used for such service. If, however, the highly porous alkali-treated separator material is impregnated with dilute resin solution and dried, it is extremely difficult to avoid a substantial reduction in the porosity through uneven distribution and accumulation of resin in greater or less amounts in the pores in certain areas.

I have found by research and experiment that if the dried alkali-treated material is immersed in a dilute solution of an alkali salt, such as sodium silicate, sodium carbonate and potassium silicate or carbonate, allowed to drain and dried before impregnation with the dilute resin solution, the tendency to uneven distribution of the resin, resulting in the sealing off of certain of the pores, is largely eliminated. The detergent and "wetting" properties of alkali salts, such as the alkali soaps, are well known. I believe the effect in the case of separator materials is due to the fact that the fibres of the material become uniformly coated with a thin film of the alkali salt, which then provides for uniform distribution of the resin films throughout the material. After impregnation with the resin, the dried material is then subjected to a wetting treatment.

The amount of resin I apply to the dried alkali treated material is not sufficient to encase the fibres completely so that in the final treatment in an aqueous solution of a wetting agent, the bulk of the alkali salt is dissolved and removed.

My invention comprises immersing dried alkali treated material, consisting of natural wood or compressed wood in fibrous or powder form, in a dilute solution of an alkali salt, with subsequent draining and drying, then impregnating the dried material with a solution of a resin or resinoid substance resistant to oxidation, to attack by sulphuric acid under the conditions of normal working of an accumulator, and soluble in a reasonably volatile solvent, the resin or resinoid substance being insufficient in quantity to encase completely the fibres of the material, and finally treating the material with a wetting agent and drying.

As an example of the application of my invention compressed fibre board is digested in aqueous sodium silicate solution of about 1.040 specific gravity, and preferably at the boiling point of the solution. The boards are dried out and may be satisfactorily machined after this stage.

The machined boards are then immersed in a 3% solution of polyvinyl chloride in cyclohexanone at room temperature for 2 to 3 hours, the time depending on the thickness. They are allowed to drain, and are dried until all the solvent has evaporated.

Finally the machined boards are submitted to the wetting treatment, which consists of immersion in an aqueous solution of a wetting agent, such as a 3% solution of a sulfonated oil that is stable to acid, preferably at a temperature of about 60° C. The excess solution is allowed to drain off and the board dried completely at a temperature up to 140° C.

As an alternative, the 3% solution of polyvinyl chloride may be replaced by a 5% solution of methylmethacrylate in acetone. Any other resin or resinoid bodies, which are resistant to oxidation and to attack by sulphuric acid under the conditions of normal working of an accumulator, and which are soluble in a reasonably volatile solvent, may be used in my process.

What I claim is:

1. A method of processing dried, alkali-treated wood separators for lead-acid electric accumulators comprising the steps of immersing the separators in an aqueous solution of sodium silicate of about 1.04 specific gravity at a temperature near the boiling point of the solution, drying the separators, immersing the separators in a solution of about 3 percent polyvinyl chloride in cyclohexanone for 2 to 3 hours, the amount of said polyvinyl chloride being insufficient to encase completely the fibers of said separators, drying the separators, immersing the separators in a 3 percent aqueous solution of sulfonated oil wetting agent at a temperature of about 60° C., and drying at a temperature up to 140° C.

2. A method of processing dried, alkali-treated wood separators for lead-acid electric accumulators comprising the steps of immersing the separators in an aqueous solution of sodium silicate of about 1.04 specific gravity at a temperature near the boiling point of the solution, drying the separators, immersing the separators in a solution of about 5 percent polymethyl methacrylate in acetone for 2 to 3 hours, the amount of said polymethyl methacrylate being insufficient to encase completely the fibers of said separator, drying the separators, immersing the separators in a 3 percent aqueous solution of sulfonated oil wetting agent at a temperature of about 60° C. and drying at a temperature up to 140° C.

3. A method of processing dried, alkali-treated wood separators for lead-acid electric accumulators comprising the steps of immersing the separators in a dilute solution of about 1.04 specific gravity of an alkali silicate of the group consisting of sodium silicate and potassium silicate, at a temperature near the boiling point of the solution, drying the separators, immersing the separators in a dilute solution of a synthetic resin of the group consisting of polyvinyl chloride and polymethyl methacrylate for two to three hours, the amount of said synthetic resin being insufficient to encase completely the fibers of said separators, drying the separators, and immersing the separators in a solution of sulfonated oil wetting agent at a temperature of about 60° C. and drying at a temperature up to 140° C.

HAROLD JOHN HAMPTON.

REFERENCES CITED

The following references are of record in the file of this patent:

UNITED STATES PATENTS

| Number | Name | Date |
|---|---|---|
| 1,020,149 | Marino | Mar. 12, 1912 |
| 2,016,162 | Wilderman | Oct. 1, 1935 |

FOREIGN PATENTS

| Number | Country | Date |
|---|---|---|
| 473,513 | Great Britain | Oct. 14, 1937 |